(12) United States Patent
Sakakibara

(10) Patent No.: US 6,747,759 B1
(45) Date of Patent: Jun. 8, 2004

(54) IMAGE FORMING APPARATUS, IMAGE PROCESSING METHOD AND RECORDING MEDIUM

(75) Inventor: Manabu Sakakibara, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,614

(22) Filed: Dec. 22, 1999

(30) Foreign Application Priority Data

Dec. 25, 1998 (JP) .......................................... 10-371535

(51) Int. Cl.[7] ................................................ H04N 1/46
(52) U.S. Cl. ...................................... 358/3.13; 358/3.2
(58) Field of Search ................ 358/1.9, 2.1, 3.13–3.19, 358/3.2

(56) References Cited

U.S. PATENT DOCUMENTS 4,858,023 A * 8/1989 Tada .......................... 358/471
5,374,996 A * 12/1994 Eguchi et al. .............. 358/3.23
5,469,267 A * 11/1995 Wang ......................... 358/3.21
5,550,647 A * 8/1996 Koike ........................ 358/3.03
5,732,151 A * 3/1998 Moon et al. ................. 382/167
5,854,882 A * 12/1998 Wang ......................... 358/1.9
6,014,462 A * 1/2000 Yamakawa .................. 382/200

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

An image processing apparatus comprises gradation converting means for executing a gradation conversion for process input image data and dither conversion processing means for converting the gradation conversion processed image data into a plurality of image data by using a dither matrix, wherein the gradation conversion processed image data has the number of conversion errors due to the gradation conversion smaller than the number of gradation expressible by the dither matrix.

7 Claims, 13 Drawing Sheets

FIG. 2A

| VIN [7..0] | VA [11..0] |
|---|---|
| 00 | 000 |
| 01 | 010 |
| 02 | 020 |
| 03 | 030 |
| 04 | 040 |
| 05 | 050 |
| ⋮ | ⋮ |
| 80 | 800 |
| 81 | 810 |
| 82 | 820 |
| 83 | 830 |
| 84 | 840 |
| 85 | 850 |
| ⋮ | ⋮ |
| FA | FA0 |
| FB | FB0 |
| FC | FC0 |
| FD | FD0 |
| FE | FE0 |
| FF | FF0 |

FIG. 2B

| VIN [7..0] | VA [11..0] |
|---|---|
| 00 | 000 |
| 01 | 042 |
| 02 | 085 |
| 03 | 0B1 |
| 04 | 0D0 |
| 05 | 0E3 |
| ⋮ | ⋮ |
| 80 | 71D |
| 81 | 720 |
| 82 | 723 |
| 83 | 726 |
| 84 | 729 |
| 85 | 732 |
| ⋮ | ⋮ |
| FA | F1F |
| FB | F31 |
| FC | F52 |
| FD | F78 |
| FE | FB1 |
| FF | FF0 |

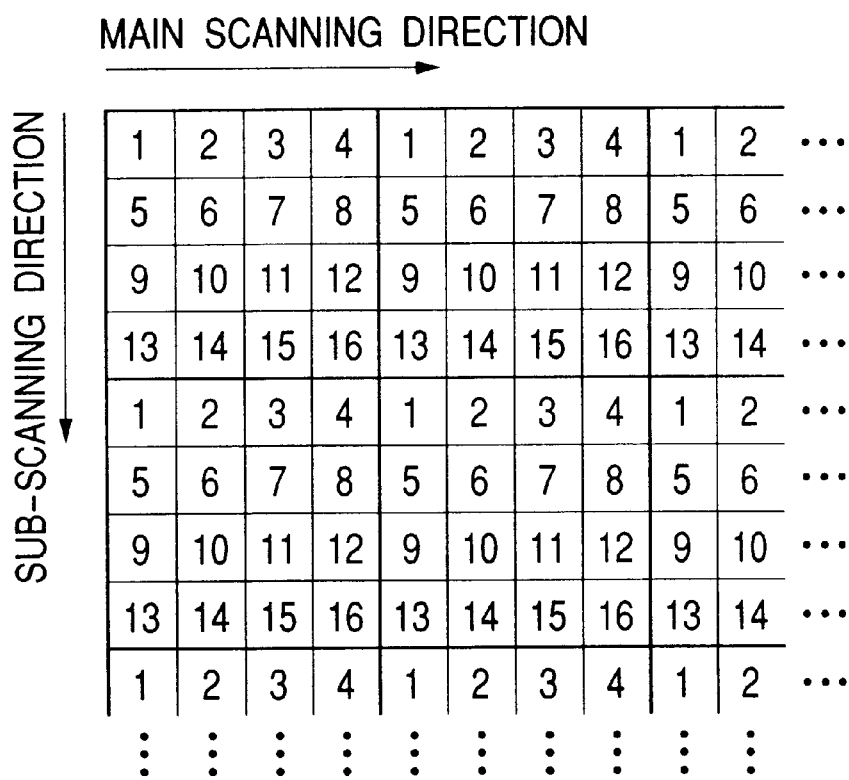

FIG. 5

| ADDRESS | CONTENT OF DATA CONVERSION |
|---|---|
| 000 | DITHER CONVERSION DATA OF PIXEL NUMBER 1  ( 00h TO FFh ) |
| 100 | DITHER CONVERSION DATA OF PIXEL NUMBER 2  ( 00h TO FFh ) |
| 200 | DITHER CONVERSION DATA OF PIXEL NUMBER 3  ( 00h TO FFh ) |
| 300 | DITHER CONVERSION DATA OF PIXEL NUMBER 4  ( 00h TO FFh ) |
| 400 | DITHER CONVERSION DATA OF PIXEL NUMBER 5  ( 00h TO FFh ) |
| 500 | DITHER CONVERSION DATA OF PIXEL NUMBER 6  ( 00h TO FFh ) |
| 600 | DITHER CONVERSION DATA OF PIXEL NUMBER 7  ( 00h TO FFh ) |
| 700 | DITHER CONVERSION DATA OF PIXEL NUMBER 8  ( 00h TO FFh ) |
| 800 | DITHER CONVERSION DATA OF PIXEL NUMBER 9  ( 00h TO FFh ) |
| 900 | DITHER CONVERSION DATA OF PIXEL NUMBER 10 ( 00h TO FFh ) |
| A00 | DITHER CONVERSION DATA OF PIXEL NUMBER 11 ( 00h TO FFh ) |
| B00 | DITHER CONVERSION DATA OF PIXEL NUMBER 12 ( 00h TO FFh ) |
| C00 | DITHER CONVERSION DATA OF PIXEL NUMBER 13 ( 00h TO FFh ) |
| D00 | DITHER CONVERSION DATA OF PIXEL NUMBER 14 ( 00h TO FFh ) |
| E00 | DITHER CONVERSION DATA OF PIXEL NUMBER 15 ( 00h TO FFh ) |
| F00 | DITHER CONVERSION DATA OF PIXEL NUMBER 16 ( 00h TO FFh ) |

FIG. 13

| VIN [7..0] | VB [7..0] |
|---|---|
| 00 | 00 |
| 01 | 04 |
| 02 | 08 |
| 03 | 0B |
| 04 | 0D |
| 05 | 0E |
| ⋮ | ⋮ |
| 80 | 71 |
| 81 | 72 |
| 82 | 72 |
| 83 | 72 |
| 84 | 72 |
| 85 | 73 |
| ⋮ | ⋮ |
| FA | F2 |
| FB | F3 |
| FC | F5 |
| FD | F8 |
| FE | FB |
| FF | FF |

IMAGE FORMING APPARATUS, IMAGE PROCESSING METHOD AND RECORDING MEDIUM

BACKGROUND OF THE INVENTION

1. Field of the Invention

The present invention relates to density control.

2. Related Background Art

FIG. 9 is a sectional view showing the structure of a multicolor image forming apparatus. This prior art will be described below with reference to FIG. 9.

Latent images of different colors formed on an image carrier 100 by an internal semiconductor laser 204 of an optical unit 101 are developed into visual images by color toners of Y (yellow), M (magenta), C (cyan), and K (black) supplied from color developing devices Dy, Dm, and Dc, and Dk. These developed images are transferred onto the outer surface of a transfer belt 102 a plurality of times of rotation to form a multicolor image. That is, a high voltage is applied to the transfer belt 102 to transfer the toners onto the transfer belt 102.

A recording sheet 105 supplied from a paper supply unit 103 or a paper supply tray 104 is conveyed through a paper conveyance path, and the multicolor image is again transferred from the transfer belt 102 onto this recording sheet 105. After that, the recording sheet 105 is conveyed by conveyor rollers 106, fixed by a fixing unit 107, and delivered to a paper delivery tray 108 or a paper delivery unit 109.

Each color developing device has rotary support shafts on its two ends and is held in a developing device mechanism 110 so as to be rotatable on these rotary support shafts. The developing device mechanism 110 performs rotation control to select one of these color developing devices.

A cleaning unit 111 removes toner from the surface of the transfer belt 102. A waste toner unit 112 contains waste toner from the image carrier 100. A density sensor 113 senses the density of a toner image.

FIG. 10 is a block diagram showing an image data processing system of the multicolor image forming apparatus shown in FIG. 10.

A γ-conversion table 201 performs γ conversion for image data VIN[7..0]. A dither conversion table 202 performs dither processing for this image data VIN[7..0]. A PWM circuit 208 modulates the pulse width of the image data VIN[7..0], thereby turning on and off the semiconductor laser 204 and printing the data.

The dither conversion table 202 expresses a gradation image by using a density matrix which is a set of a plurality of multilevel image dots. This dither conversion table 202 is composed of, e.g., an SRAM which converts the image data VIN[7..0] on the basis of dither matrix position information from a sub-scanning counter 205 and a main-scanning counter 206.

FIG. 11 is a view for explaining the way the dither conversion table 202 performs dither conversion. That is, FIG. 11 shows the relationship between the image data VIN[7..0], a conversion output VB[7..0] from the dither conversion table 202, and a print example obtained by pulse width modulation by the PWM circuit 203.

Even when a plurality of pixels collectively express the density, the relationship between the image data and the actual printing density is nonlinear, as shown in FIG. 12A. Hence, as shown in FIG. 12B, a halftone correction curve is derived by calculations to linearly correct the characteristic curve. This is the γ conversion by the γ-conversion table 201. As an example, the γ-conversion table 201 is so set as to perform data conversion as shown in FIG. 13. This data conversion improves the linearity of the gradation of an image.

In the above prior art, to perform correction as shown in FIG. 12B, the γ-conversion table 201 is set as shown in FIG. 13 to perform data conversion, thereby performing halftone density correction.

Referring to FIG. 13, however, when VIN[7..0] is 80h to 84h, the conversion output VB[7..0] has the same value 72h. As is evident from this fact, data conversion (8 bits/8 bits conversion) is done by the image data bit width, so bit missing takes place. This reduces the number of gradation and forms a pseudo contour in a printed image.

SUMMARY OF THE INVENTION

It is, therefore, an object of the present invention to be able to obtain a high-quality halftone image by preventing bit missing when γ conversion for dither matrix conversion is performed.

To achieve the above object, there is provided an image processing apparatus comprising a gradation converting unit for executing a gradation conversion process for input image data, and a dither converting unit for converting the gradation conversion processed image data into a plurality of image data by using a dither matrix, wherein the gradation conversion processed image data has the number of conversion errors due to the gradation conversion smaller than the number of gradation expressible by the dither matrix.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A and 2B are views showing the contents of γ conversion in the embodiment;

FIG. 4 is a view showing the contents of a dither matrix in the embodiment;

FIG. 5 is a view showing the contents of a dither conversion table in the embodiment;

FIG. 13 is a view showing the contents of γ conversion in the conventional multicolor image forming apparatus.

DETAILED DESCRIPTION OF THE PREFERRED EMBODIMENT

Figure 1:
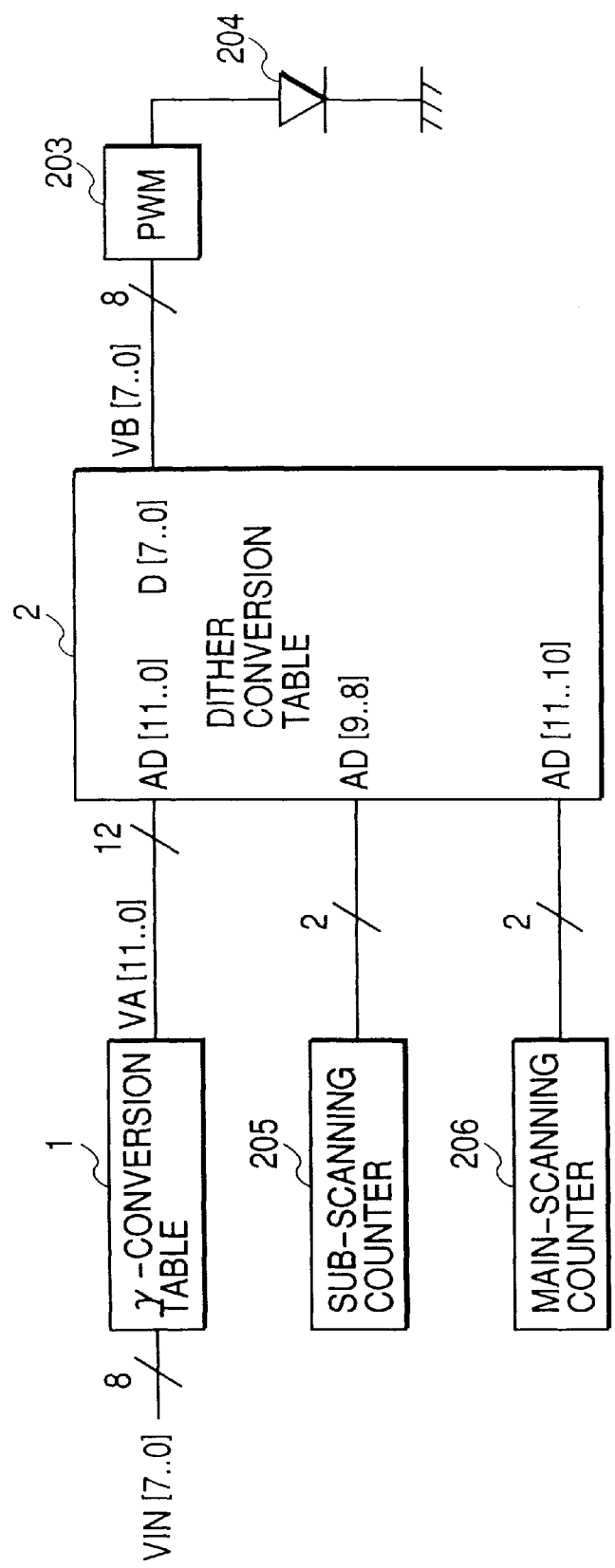
FIG. 1 is a block diagram showing the arrangement of an image data processing system of a multicolor image forming apparatus according to an embodiment of the present invention.
Figure 9:
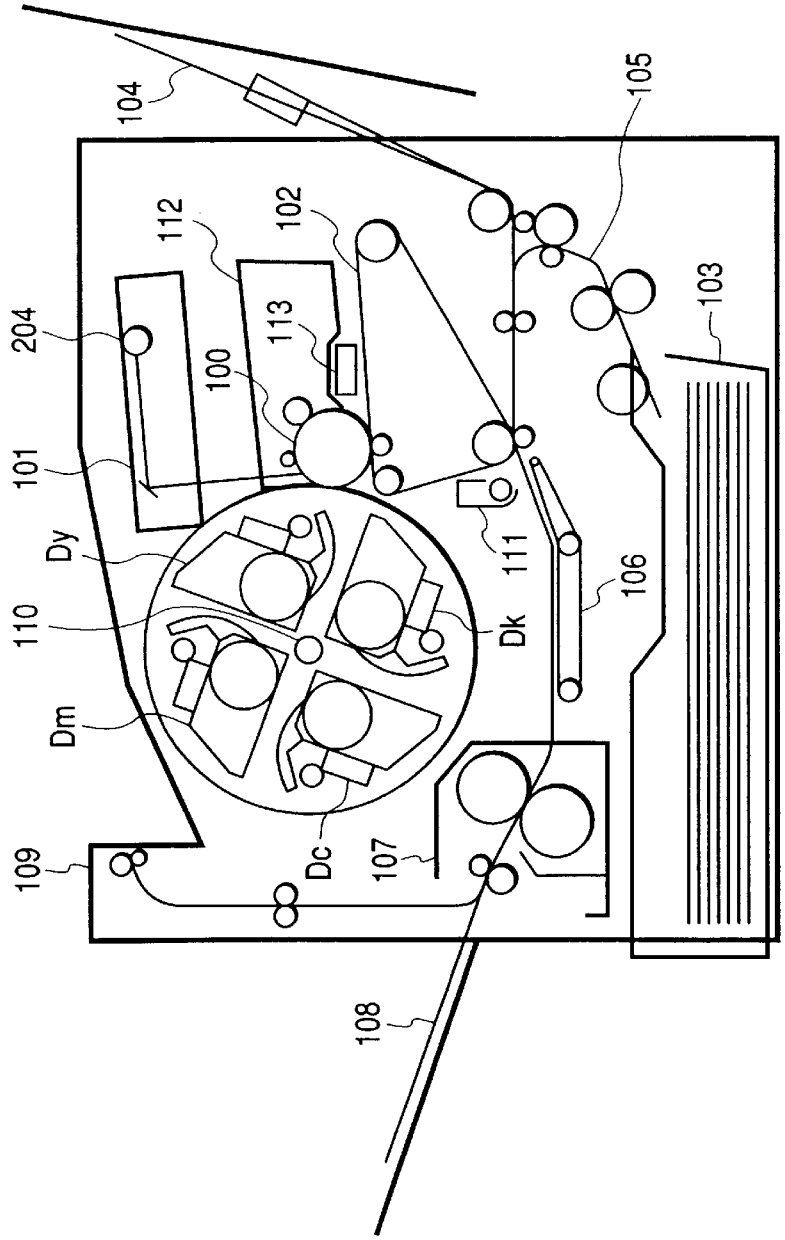
FIG. 9 is a sectional view showing the structure of an electrophotographic multicolor image forming apparatus.
Figure 10:
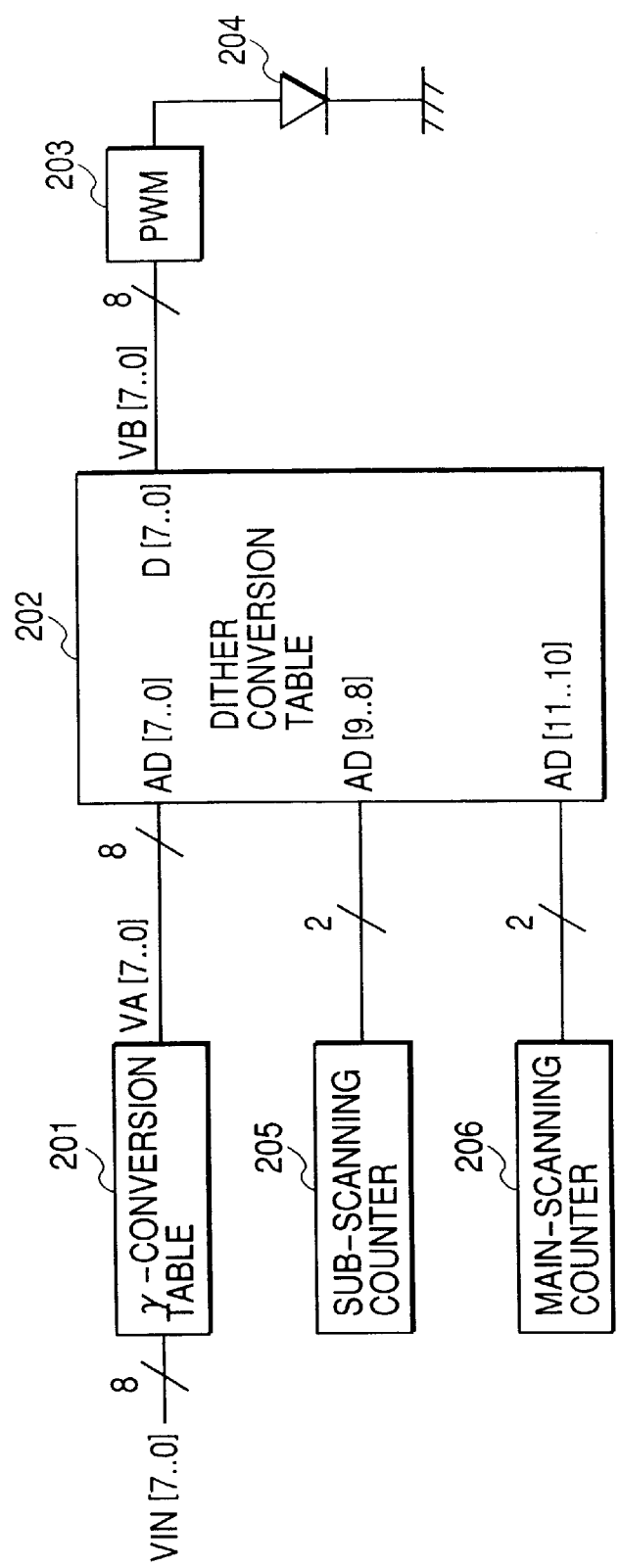
FIG. 10 is a block diagram showing the arrangement of an image data processing system of the conventional multicolor image forming apparatus.

FIG. 1 is a block diagram showing the arrangement of an image data processing system of a multicolor image forming apparatus according to an embodiment of the present invention. Note that the structure of the multicolor image forming apparatus of this embodiment is identical with, e.g., the apparatus shown in FIG. 9, and a detailed description thereof will be omitted. Note also that the same reference numerals as in FIG. 10 denote the same parts in FIG. 1.

In this embodiment, a γ-conversion table 1 is an 8-bit-input, 12-bit-output table. A dither conversion table 2 is a 16-bit-input, 8-bit-output table.

A PWM circuit 203 performs 8-bit pulse width modulation and drives a semiconductor laser 204 by a PWM signal. A counter 205 is a dither matrix sub-scanning counter (sub-scanning address generating means) for counting image clocks. A counter 206 is a dither matrix main-scanning counter (main-scanning address generating means) for counting lines.

The γ-conversion table 1 converts 8-bit input image data into 12-bit output image data of input image data (8 bits)+ matrix size (4 bits).

A method of forming this γ-conversion table will be described below.

Initially, as shown in FIG. 2A, values by which 8-bit data is simply converted into 4-bit data, i.e., multiplied by 16, are set.

Figure 3:
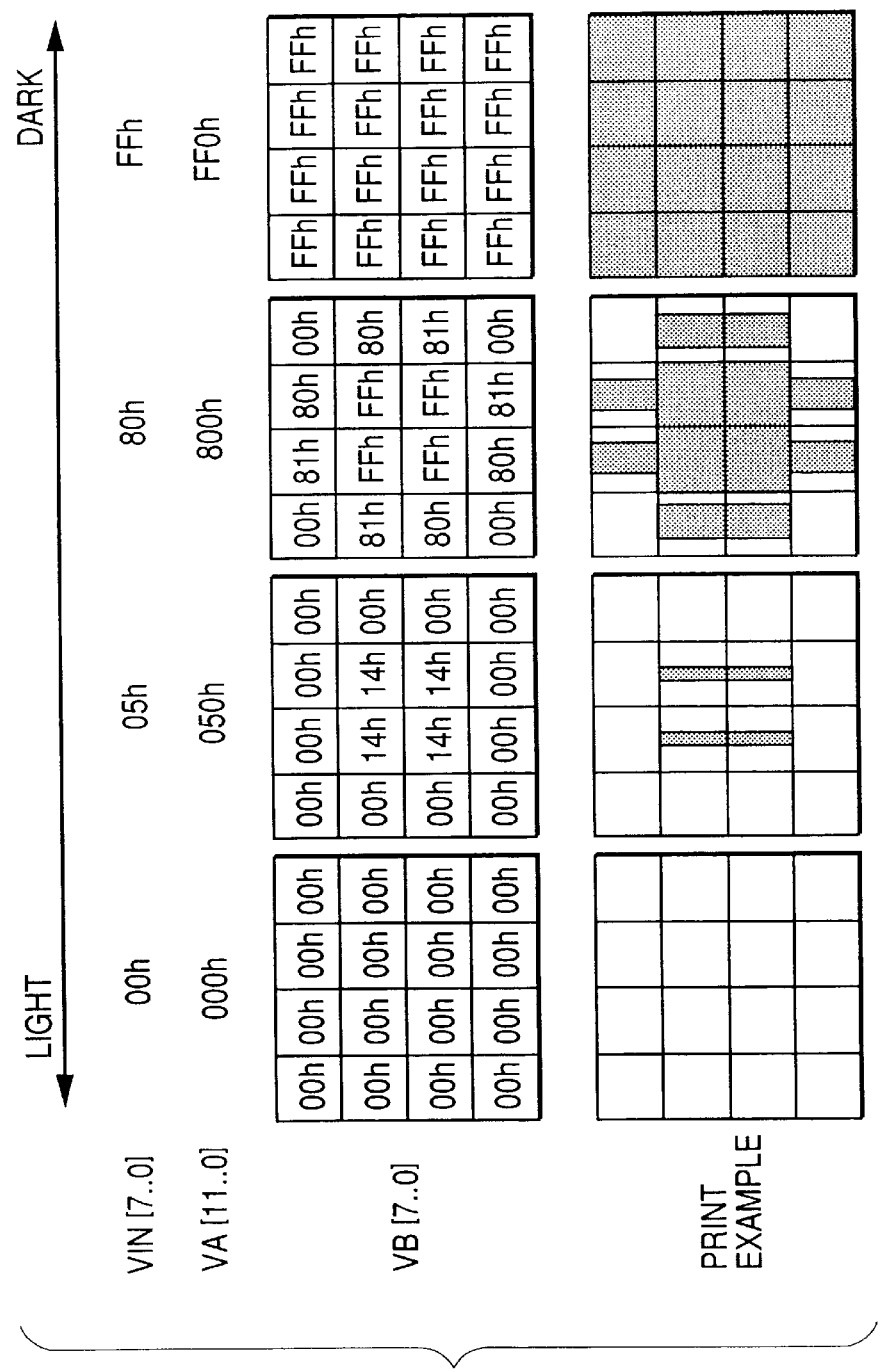
FIG. 3 is a view showing the initial data flow of an image processor in the embodiment.

FIG. 3 is a view for explaining the way dither conversion is performed at that time. That is, FIG. 3 shows the relationship between image data VIN[7..0], a conversion output VA[11..0] from the γ-conversion table 1, an output VB[7..0] from the dither conversion table 2, and a print example obtained by pulse width modulation by the PWM circuit 203.

The sub-scanning counter 205 and the main-scanning counter 206 generate dither matrix position information (pixel numbers) as shown in, e.g., FIG. 4. Also, data conversion by the dither conversion table 2 is as shown in FIG. 5. Therefore, even for the same VA[11..0] different conversion outputs VB[7..0] are generated in accordance with the dither matrix positions (pixel numbers).

Since, however, the value of VA[11..0] and the sum total of VB[7..0] in the matrix are so defined as to be equal, the density is saved in the dither matrix.

Figure 6:
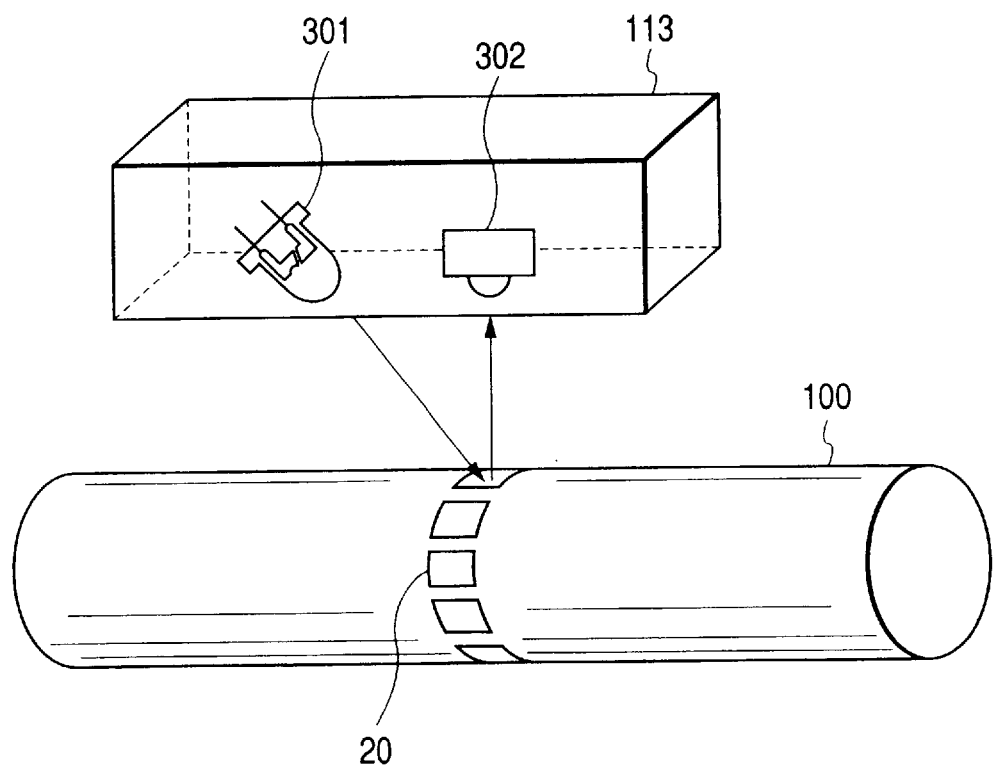
FIG. 6 is a perspective view showing the arrangement of a toner image measuring unit in the embodiment.
Figure 7:
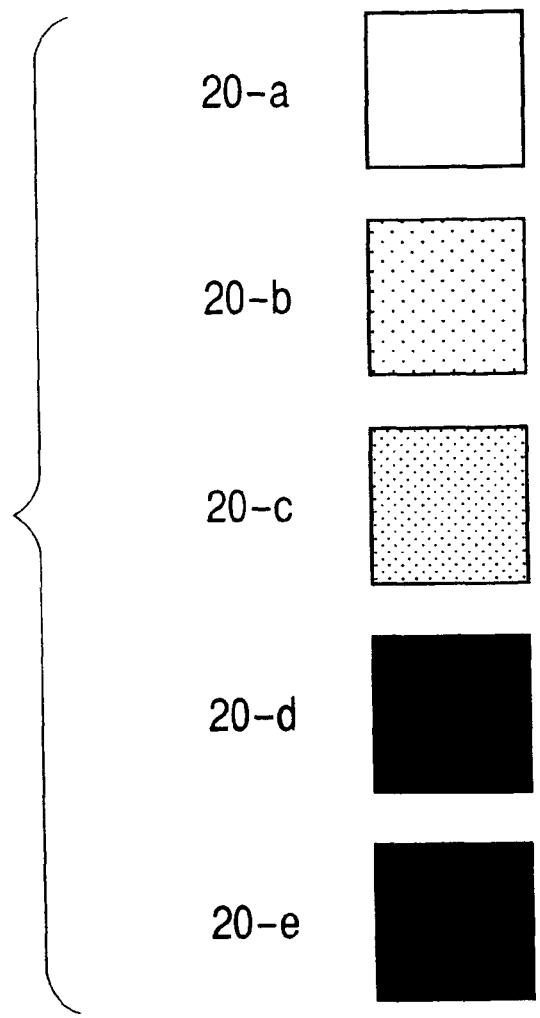
FIG. 7 is a view showing practical examples of patches measured by halftone density control in the embodiment.
Figure 8:
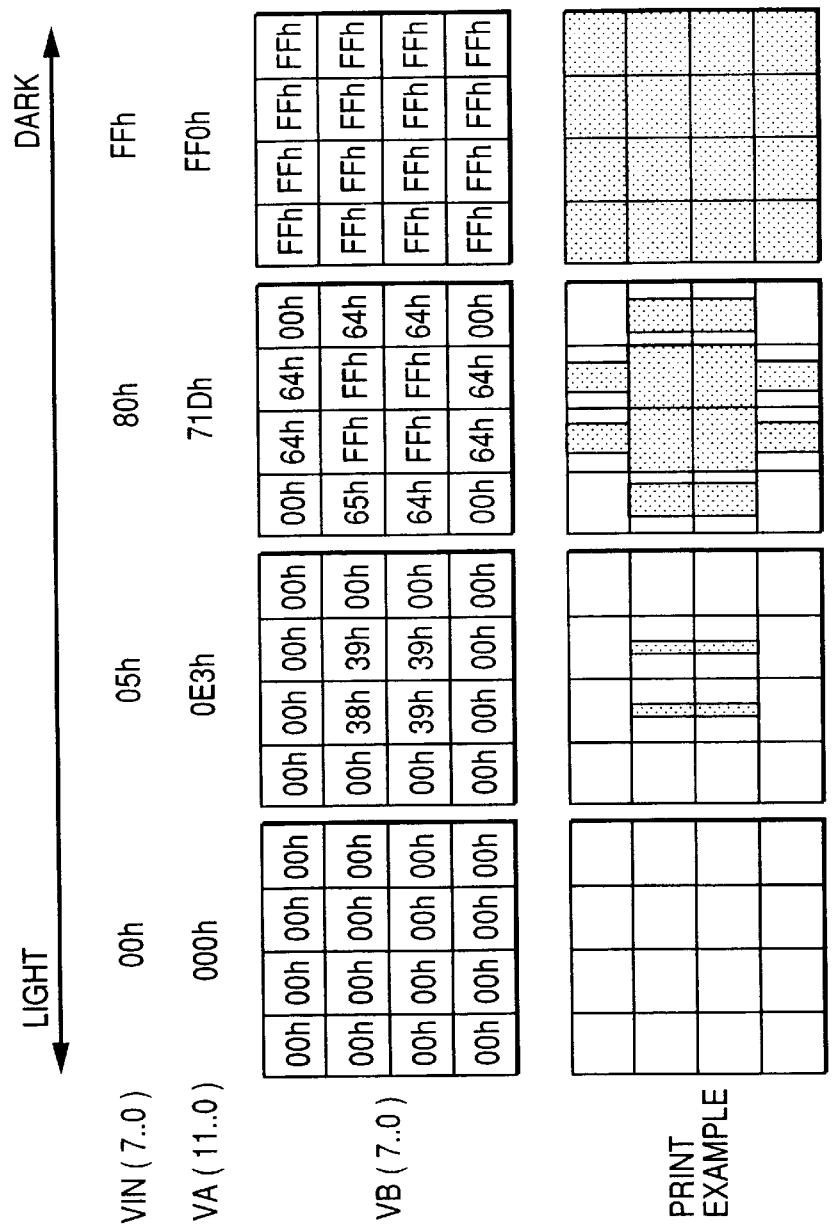
FIG. 8 is a view showing the data flow when the image processor performs correction in the embodiment.

In this state, as shown in FIG. 6, toner images 20 for measurement are formed on an image carrier 100. These toner images 20 for measurement are, for example, as shown in FIG. 7. However, the number and shapes of these toner images 20 are not restricted and change in accordance with the diameter or size of the image carrier, the time of density control, or the like.

These toner images 20 for measurement are irradiated with light from an internal light-emitting element 301 of a density sensor 113 placed perpendicularly to the surface of the image carrier 100. A light-receiving element 302 detects the reflected light. The contents of the γ-conversion table 1 are rewritten in accordance with the difference between this detection level and a predetermined detection level, thereby controlling the halftone density.

Figure 12A:
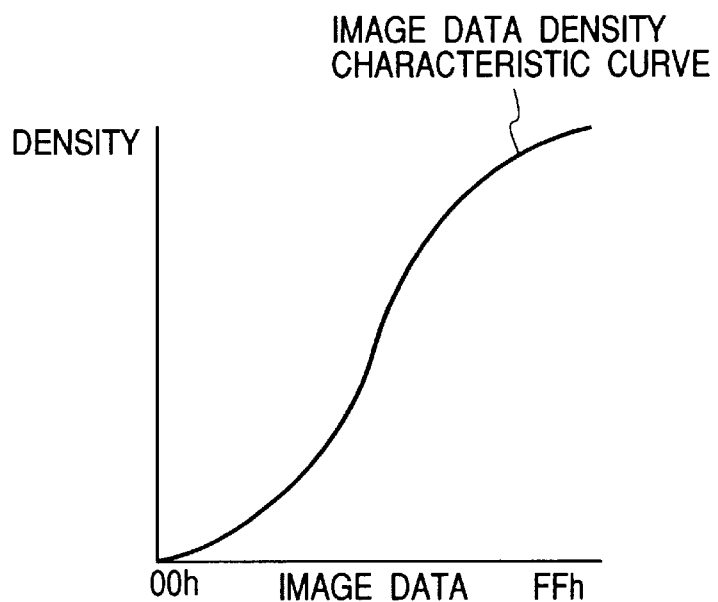
FIGS. 12A and 12B are graphs showing the image data-density characteristic curves of the multicolor image forming apparatus.
Figure 12B:
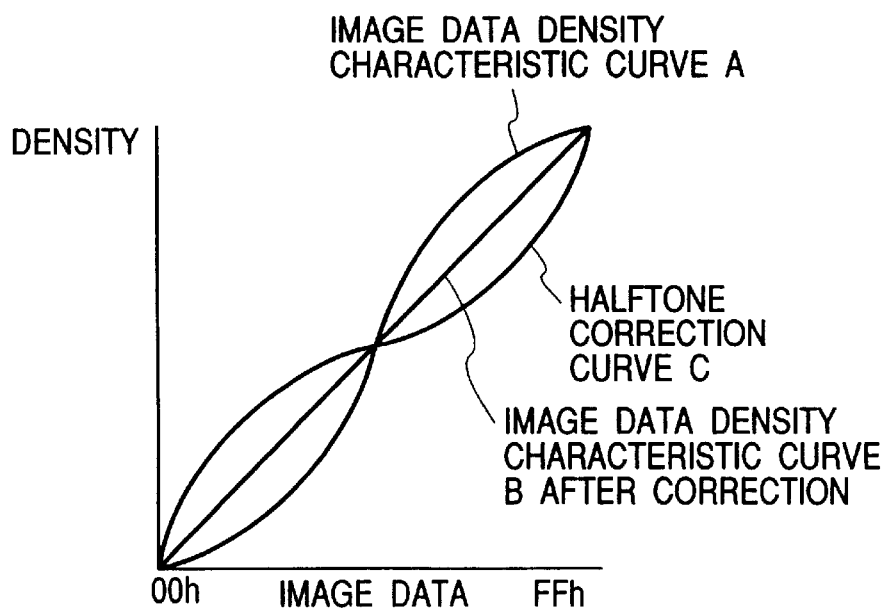

FIG. 12A shows the relationship between the density value, as the result of measurement of images 20-a, 20-b, 20-c, 20-d, and 20-e shown in FIG. 7 performed by the density sensor 113, and the image data during patch formation. This image data density characteristic curve shown in FIG. 12A has a sharp density rise near the center of the image data. Hence, as shown in FIG. 12B, a halftone correction curve is derived by calculations to linearly correct the characteristic curve. For example, the contents of the γ-conversion table 1 are rewritten as shown in FIG. 2B.

Figure 11:
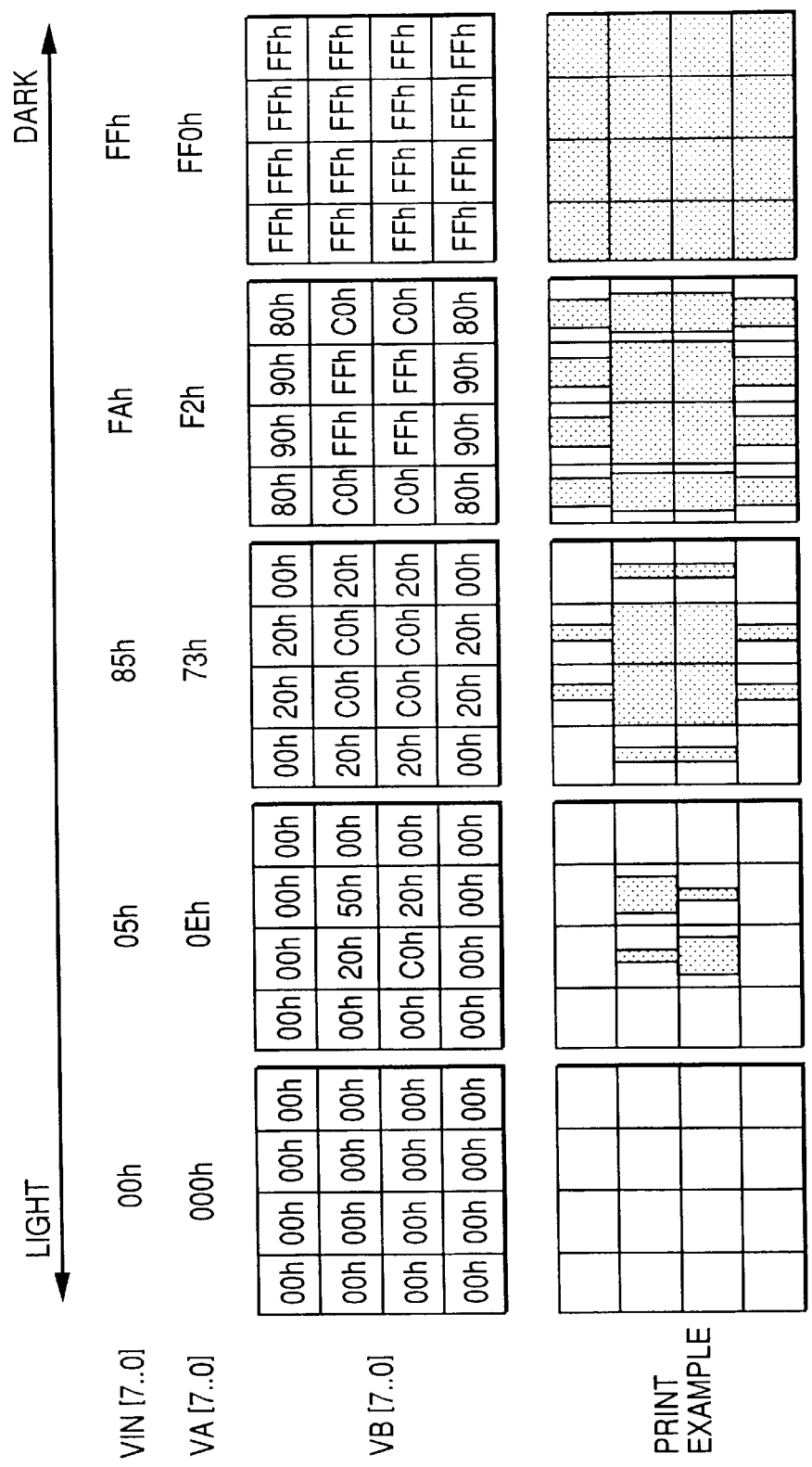
FIG. 11 is a view showing the data flow in an image processor of the conventional multicolor image forming apparatus.

The γ-conversion table 1 converts input image data into the number of bits corresponding to the sum total by which the density can be expressed in the dither matrix. Furthermore, the γ-conversion table 1 is set on the basis of the density characteristic of the image forming apparatus. Therefore, as shown in FIG. 11, the result of dither conversion after γ conversion exhibits good density characteristics.

That is, this embodiment performs γ correction by which data conversion using all the numbers of ideal densities that can be expressed by a dither matrix is performed. Consequently, no bit missing due to data conversion occurs, so good γ correction which does not degrade the number of gradation can be performed. Accordingly, high-quality halftone images having no pseudo contour can be obtained.

Note that the conversion table formation process is performed in accordance with predetermined conditions (e.g., during standby after the power-on of the image forming apparatus, after the image forming apparatus has printed a predetermined number of sheets, or after the elapse of a certain specific time).

As has been described above, in this embodiment, the number of correction errors by γ conversion is made smaller than the number of densities expressible by a density matrix. Accordingly, it is possible to prevent bit missing and suppress the generation of a pseudo contour in a printed image.

OTHER EMBODIMENTS

The scope of the present invention also includes a case where program codes of software for realizing the functions of the aforesaid embodiment (e.g., the dither conversion function shown in FIG. 1 and the γ-conversion table calculating function explained with reference to FIGS. 6, 7, 12A, and 12B) are supplied to a computer of an apparatus or system, so connected to various devices as to operate these devices to realize the embodiment functions, and the computer (CPU or MPU) of the system or apparatus operates these devices in accordance with the stored programs.

In this case, the program codes of the software realize the functions of the embodiment, and the program codes and a means for supplying these program codes to the computer, e.g., a storage medium storing the program codes, constitute the present invention.

As this storage medium for storing the program codes, it is possible to use, e.g., a floppy disk, a hard disk, an optical disk, a magnetooptical disk, a CD-ROM, a CD-R, a magnetic tape, a nonvolatile memory card, and a ROM.

Furthermore, besides the functions of the above embodiment are realized by executing program codes by a computer, the present invention includes program codes which realize the functions of the above embodiment in cooperating with an OS (Operating System) or another application software working on the computer.

Moreover, the present invention also includes a case where, after the supplied program codes are stored in a memory of a function expansion board of the computer or in a memory of a function expansion unit connected to the computer, a CPU or the like of this function expansion board or unit performs a part or the whole of actual processing in accordance with designations by the program codes, and the functions of the embodiment are realized by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

gradation converting means for executing a gradation conversion on process input image data; and dither conversion processing means for converting the gradation conversion processed image data into a plurality of image data by using a dither matrix, wherein the number of bits of the process input image data corresponds to the number of bits capable of being expressed in the dither matrix, said dither conversion processing means switches the dither matrix, in accordance with a pixel position indicted by the input image data, and a sum total of the dither-converted image data within the dither matrix is substantially equivalent to the value of the process input image data.

2. An apparatus according to claim 1, further comprising calibrating means for calibrating a gradation conversion condition of said gradation converting means.

3. An apparatus according to claim 1, further comprising image forming means for forming an image on the basis of the dither-converted image data.

4. An apparatus according to claim 1, wherein the number of bits of the gradation conversion processed image data corresponds to the number of bits of the input image data and the size of the dither matrix.

5. An image processing method comprising the steps of:

executing a gradation conversion process on input image data; and converting the gradation conversion processed image data into a plurality of image data by using a dither matrix, wherein the number of bits of the process input image data corresponds to the number of bits capable of being expressed in the dither matrix, said dither conversion processing means switches the dither matrix, in accordance with a pixel position indicted by the input image data, and a sum total of the dither-converted image data within the dither matrix is substantially equivalent to the value of the process input image data.

6. A method according to claim 5, wherein the number of bits of the gradation conversion processed image data corresponds to the number of bits of the input image data and the size of the dither matrix.

7. A recording medium which stores a program, said program comprising:

a code of the step of executing a gradation conversion process on input image data; and a code of the step of converting the gradation conversion processed image data into a plurality of image data by using a dither matrix, wherein the number of bits of the process input image data corresponds to the number of bits capable of being expressed in the dither matrix, said dither conversion processing means switches the dither matrix, in accordance with a pixel position indicted by the input image data, and a sum total of the dither-converted image data within the dither matrix is substantially equivalent to the value of the process input image data.

* * * * *